March 5, 1974     R. P. DE TORRE     3,795,502

METHOD OF CUTTING GLASS

Original Filed July 23, 1970     3 Sheets-Sheet 1

- 16 — DEEP-FISSURE SCORING TRIM FROM LONGITUDINAL EDGES AND ENDS OF FLAT GLASS.
- 18 — MECHANICAL TAPPING ONE END OF SAID SCORE
- 20 — APPLYING HEAT ALONG SAID SCORE FROM ABOVE FROM SAID ONE END TO THE OTHER END, THEREBY PROPAGATING SAID SCORE BUT LEAVING A SKIN REMAINING
- 22 — HEAT BOTTOM
- 24 — SUPPORTING SAID SCORE ON LONG NARROW TRIMS FROM THE BOTTOM
- 26 — SNAPPING BOTTOM SKIN
- 28 — SEAMING UPPER AND LOWER PORTIONS OF THE EDGES AND ENDS SO CUT

FIG. 1

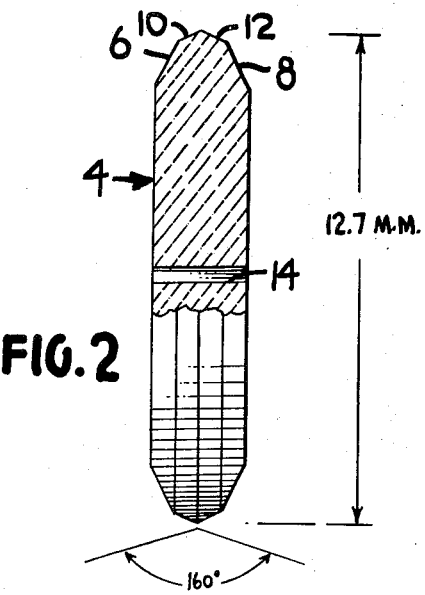

FIG. 2

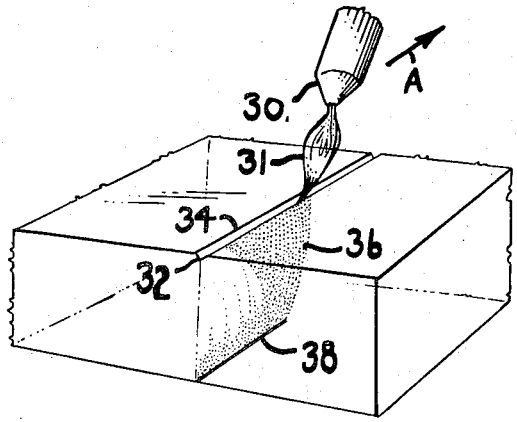

FIG. 3

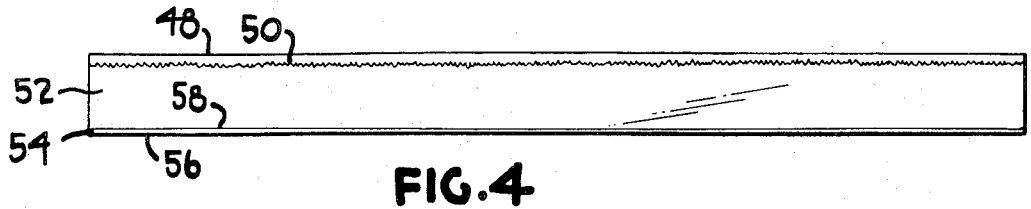

FIG. 4

March 5, 1974  R. P. DE TORRE  3,795,502

METHOD OF CUTTING GLASS

Original Filed July 23, 1970  3 Sheets-Sheet 2

| | |
|---|---|
| 16' | DEEP-FISSURE SCORING CIRCUMFERENCE OF A CIRCLE ON A FLAT GLASS |
| 18' | CENTER TOP TAPPING TO PROPAGATE FRACTURE |
| 20' | APPLYING HEAT ALONG SAID FRACTURE FROM ABOVE TO FURTHER PROPAGATE SAID FRACTURE |
| 22' | APPLYING HEAT ALONG SAID SCORE FROM BELOW TO FURTHER PROPAGATE SAID FRACTURE BUT LEAVING A THIN SKIN REMAINING |
| 24' | APPLYING EDGE NICKS TO THE FLAT GLASS |
| 24" | APPLYING SPOT HEAT TO EACH EDGE NICK UNTIL A VENT IS COMPLETED TO THE CIRCLE |
| 26' | BREAKOUT |
| 28' | LIGHT SEAMING OF UPPER AND LOWER EDGES OF CIRCLE |

FIG. 5

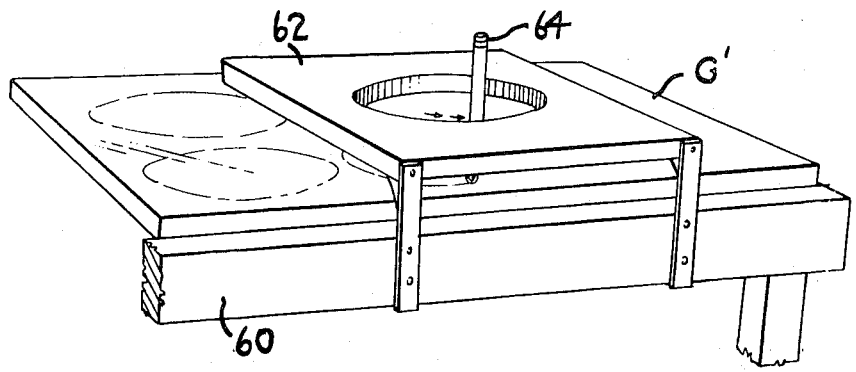

FIG. 6

March 5, 1974   R. P. DE TORRE   3,795,502
METHOD OF CUTTING GLASS
Original Filed July 23, 1970   3 Sheets-Sheet 3
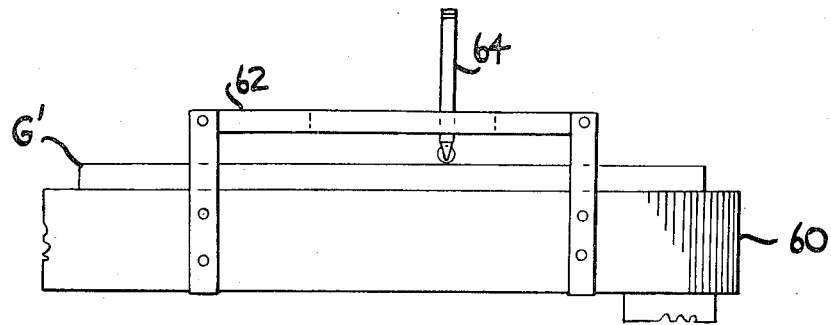
FIG. 7
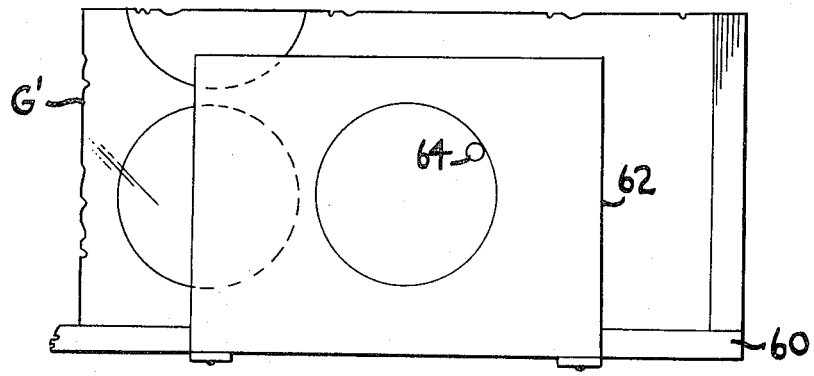
FIG. 8
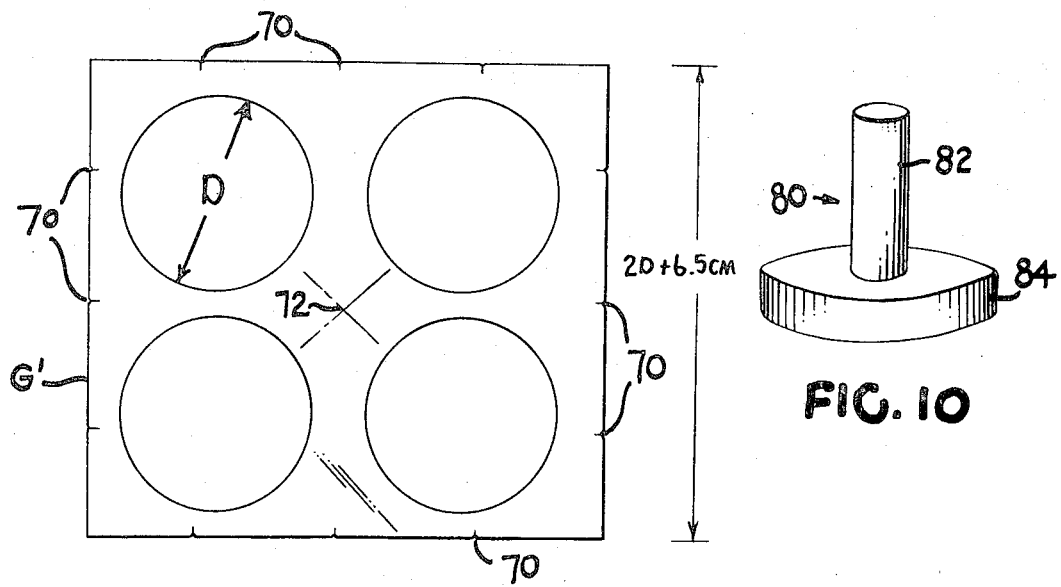
FIG. 9
FIG. 10

United States Patent Office 3,795,502
Patented Mar. 5, 1974

3,795,502
METHOD OF CUTTING GLASS
Robert P. De Torre, Pittsburgh, Pa., assignor to PPG Industries, Inc., Pittsburgh, Pa.
Original application July 23, 1970, Ser. No. 57,574, now abandoned. Divided and this application May 26, 1972, Ser. No. 257,130
Int. Cl. C03b 33/02
U.S. Cl. 65—174                                      6 Claims

ABSTRACT OF THE DISCLOSURE

Pieces of glass about 18 millimeters thick are cut to desired size without the necessity of grinding to size and polishing. In a first embodiment, edges of the piece are cut in accordance with a procedure involving the use of a scoring wheel of larger-than-usual diameter and a greater-than-usual applied pressure, to produce a fissure 1.75 millimeters deep or more, followed by the application of heat along the length of the score to cause the glass to become nearly severed. A thin glass layer remains that is easily severed. Light seaming of the tops and bottoms of the edges completes the preparation of those edges. In a second embodiment, a curved deep-fissure is produced by a scoring wheel of larger-than-usual diameter under greater-than-usual pressure, in the same manner as the first embodiment. However, a top center tap is used to propagate a fracture, leaving only a thin glass layer. Light seaming completes the preparation of the curved edge.

This is a division of application Ser. No. 57,574, filed July 23, 1970, now abandoned.

BACKGROUND OF THE INVENTION (1) Field of the invention

This invention relates to a method for cutting glass, and in particular, for the manufacture of architectural panels and furniture tops of glass about 18 to 19 millimeters thick and having dimensions such as 4 meters by 8 meters or circles and ovals from about 15 centimeters in diameter and up.

(2) Description of the prior art

In the manufacture of architectural-glass panels and furniture tops of the kind indicated above, it has hitherto been usual to obtain panels of the desired size by hand scoring and mechanical snapping of the edges of the glass to yield a piece somewhat greater in its dimensions than the final size desired, followed by the grinding of the edges of the piece to the desired size and the polishing of the ground edges. The grinding and polishing are time-consuming and costly operations, but they have hitherto been considered necessary. The scoring and snapping hitherto done in the preparation of panels of this kind has invariably left an edge of such low quality that such grinding and polishing could not be avoided.

In the past, it has been more common for architectural panels to have a surface area somewhat smaller than that indicated above and to be made of glass about 5 to 14 millimeters thick. There has been increasing demand, however, for panels of larger surface area and, in view of the larger surface area, of greater strength (thickness), so as to withstand increased wind load.

It is important that the architectural panels so produced exhibit adequate edge strength. When tested in accordance with the conventional beam-loading test, the ground-and-polished edges of a 4 meter by 8 meter sheet, 18 millimeters thick, produced in accordance with the prior art exhibit values such as about 4.63 to 4.91 kilograms per square centimeter. Panels exhibiting values substantially lower than that are noticeably more susceptible to breakage.

Prior to the instant invention, it has not been customary to use a relatively blunt (over 140°) scoring wheel having a diameter as great as 12.7 millimeters i.e., about ½ inch. Ordinarily, scoring wheels have been used that are about 3 to 5 millimeters in diameter. It has not been usual to use a cutting angle as blunt as 160° on a 12.7-millimeter wheel, nor to produce a fissure by scoring the glass as deeply as is done in accordance with the instant invention. It has been known that it is important, during scoring, to avoid the development of a defect called "wing." It is known that higher scoring pressures or the use of sharper cutting angles on the scoring wheel tend to produce the unwanted "wing."

The cutting of glass by the action of stress-generating heat is known. In this connection, reference may be made to Campbell et al., U.S. Pat. No. 1,720,883; Hitner, U.S. Pat. No. 1,777,644; Spinasse, U.S. Pat. No. 1,973,546; Hafner, U.S. Pat. No. 3,453,097; and Chatelain et al. U.S. Pat. No. 3,474,944.

The Campbell et al. patent discloses the severing of glass in accordance with a method comprising "bringing a hot object or objects or elements, heated electrically or otherwise, into contact with or into close proximity of the glass." It discloses, moreover, that: "In order to quickly initiate the severing action, a nick or fault or other weakened portion may be formed by the apparatus at a point on the glass at the line of cleavage where the severing action is to start."

The Hitner patent discloses "an improved apparatus adapted to prevent the somewhat irregular line of fracture which has hitherto been characteristic of the severing of glass by the use of an electrically heated wire or ribbon." The Hitner patent uses an electrically heated wire for the non-contact severing of glass, but it teaches "providing means for giving a distribution of heat over a substantial area of glass on each side of the ribbon or wire," saying that, "As a result, the line of fracture is smooth and regular, approximating in these particulars the line of fracture secured by scoring the glass with a diamond or wheel."

The Spinasse patent teaches having "a tubular portion of metal or other suitable refractory material adapted to present a heating surface in close contact with or in close proximity to the body of the drawing sheet near the region where the same is to be cut to remove the border." It teaches further: "It will be obvious, therefore, that as the sheet of glass is drawn past the heating element the border of the glass is heated in a path parallel to and near the edge of the sheet so that if the glass could be cut or checked by means of a cold checking tool beyond the heated path, shown by the broken line in FIG. 2, the border can be easily removed without fracturing the body of the sheet." The patent further teaches that the "temperature of the heating element can be varied according to the thickness of the glass or the speed at which it is drawn past the heater but as a rule a cherry-red heat yields good results for the average sheet at the average speed of drawing."

The Hafner patent discloses a method of cutting glass "wherein the glass sheet is moved continuously past a continuous laser beam which is focused upon the glass sheet. The laser and absorptive characteristics and parameters are selected so that the glass absorbs the laser energy and converts it into sufficient heat to enable separation of the sheet into pieces along the line swept by the laser beam."

The Chatelain et al. patent discloses a method of cutting glass wherein scoring "produces a fissure which propagates deeply into the sheet and usually extends to the opposite face thereof." The heat is applied at a preselected number of points spaced just outside the scored line, thus causing the band to break and drop away, leaving intact the first panel." These patents are not pertinent to the cutting of circles.

SUMMARY OF THE INVENTION

In one embodiment, grinding to size and edge polishing, in the preparation of pieces of glass are advantageously avoided by use of a cutting procedure that involves deep scoring under high pressure, using a relatively large scoring wheel, followed by thermal opening of the deep score, preferably under conditions that cause the deep-score fissure to propagate until it is within about 1 to 2 millimeters of the opposite face of the glass. The dwell time of the heat at the beginning of the thermal-opening step is reduced by mechanically tapping one end of a deep-fissure score that is to be thermally opened as mentioned above. Relatively light seaming of the top and bottom portions of the edges of the glass so cut yields cut edges that are substantially as strong as conventional ground-and-polished edges. In a broader aspect, the invention provides a way of taking thinner edge trims from pieces of glass than are customarily taken by conventional methods involving hand scoring and mechanical snapping. This has obvious advantages, particularly in respect to minimizing wastage of glass.

In the second embodiment, curved edges such as circles and ovals, are cut in a manner identical with the first embodiment, except that a top center tap is used to propagate a fracture around the curved deep fissure.

DESCRIPTION OF THE DRAWINGS

A complete understanding of the invention may be obtained from the foregoing and following description thereof, taken together with the appended drawings, in which:

FIG. 1 is a flow diagram of a process in accordance with a first embodiment of the present invention;

FIG. 2 is a vertical cross-sectional view of a cutting wheel used in the practice of the present invention;

FIG. 3 is a perspective view of a jet heat source directing heat along a deep-fissure score line;

FIG. 4 is an elevation view of an edge of a piece of glass cut in accordance with the instant invention;

FIG. 5 is a flow diagram of a process in accordance with a second embodiment of the invention;

FIG. 6 is a perspective view of a typical set-up for cutting circles in accordance with the second embodiment of this invention;

FIG. 7 is a elevation view of the set-up in FIG. 7;

FIG. 8 is a top view of the set-up in FIG. 7;

FIG. 9 is a top view of a glass surface after it has been nicked; and

FIG. 10 is a perspective view of a tool used to top center tap.

DESCRIPTION OF THE PREFERRED EMBODIMENTS

Referring to FIG. 1, a flow diagram of a process in accordance with the present invention is shown. While this process is useful in the cutting of all flat glass, it has particular utility on thick pieces of glass, for example, a piece 18 millimeters thick, 3.3 meters wide, and 6.9 meters long. This is because of the fact that prior methods were not capable of producing a high quality cut on thick glass efficiently. A piece having the dimensions indicated above is sometimes referred to by the inventor as an "uncut jumbo." A piece of glass of such dimensions may conveniently be made in accordance with conventional float-process technology. It is to be understood that in order to obtain glass of the thickness mentioned above, suitable measures are taken in the float process. All that is required for the production of the "uncut jumbo" is that the float ribbon be cut transversely of its length at suitably spaced intervals, such as at distances about 5 to 10 meters apart. The exact dimensions will depend upon the dimension requirements of the finished piece.

The deep-fissure scoring of block 16 in the flow diagram of FIG. 1 is such, in a piece of flat glass 18 millimeters thick, as to produce a fissure having a depth of at least 1.75 millimeters. Such a deep-fissure score is conveniently made by means of a scoring wheel of the kind depicted in FIG. 2.

Referring to FIG. 2, there is shown a cutting or scoring wheel 4 made of carbide or other suitable material and having a diameter of about 12.7 millimeters i.e., about ½ inch. The base angle, i.e., the angle between the two sides 6 and 8, if extended, is 120°, and the angle between the sides 10 and 12 (the cutting angle) is between 150° and 165° with 160° providing optimum results. The wheel is provided with a central axle hole 14 having, as indicated, a diameter of about 2.36 millimeters. A shaft is passed through the axle hole, and the wheel 4 is urged into contact with the glass to be cut at a force of 56.7 kilograms. This is done by means of a cutting instrument having a backup wheel positioned beneath the glass and adjustable means urging together the backup wheel and the cutting wheel 4 so as to permit the scoring pressure to be appropriately adjusted. The scores so produced correspond to the intended location of the edge of the finished piece. The operation of cutting the bulb edges and ends of the "uncut jumbo" may be brought about by any suitable means, such as a vacuum-cup lifting device. To guide the cutting device mentioned above, a straight-edge member is secured to the glass. This feature is conventional in prior art scoring. If desired, a suitable oil or lubricant can be applied to the upper surface of the glass along the path of the intended scoring and cut.

Although the end-removal operations may be performed at an early stage in the finishing of the piece of glass involved, it is ordinarily desirable to wait until the width of the sheet has been cut to the desired dimension, before working upon the ends. It is relatively safe to postpone the length-reducing operation to the end of the plate-finishing operation, since the transverse (end) cuts are relatively short ones, i.e., ones that are usually somewhat less likely to give difficulty than the cuts along the longitudinal edges of the plate.

Referring now to the block 18 of FIG. 1, there is indicated a step of mechanical tapping an end of the score. This is done with a hammer or mallet, gently, from *beneath* the glass on the face opposite the score in the vicinity of one end of the score. The purpose of this operation is merely to start the opening to a considerable depth of the score and thereby diminish the capacity requirement of the thermal source to be used at the beginning of the immediately succeeding operation (block 20). The step of block 18 can be omitted entirely, provided that dwell time of the heating process is increased to start the propagation of the deep-fissure. Mechanical tapping saves about 10–15 seconds dwell time is 18-millimeter glass at the beginning of the heating process.

Referring now to block 20, the next step of the process comprises applying heat along the score from the top and progressively along it to nearly open it. This may be done with a small hand-held blowtorch or the like. Various kinds of hand-held torches that burn propane or other suitable gaseous fuel and readily available and are familiar to those skilled in the art; these may be used. Other alternatives will suggest themselves to persons of ordinary skill in the art, such as the use of a flameless, electrically-operated serpentine gas heater, producing an air flow of 35 cubic feet per hour at an outlet temperature of 1750° F. with a power utilization of 470 watts. The rate of passage of the heating means with respect to the score along its length should depend, to some extent, upon the potency of the thermal source and the thickness of the glass. It will probably be substantially slower than the rate of passage of the scoring apparatus since the speed of scoring is not critical it is usually high (about 25 centimeters per second). The heat source generally proceeds along the score at about 5–12 centimeters per second. The operator can tell whether the rate of the passage used is satisfactory; as the heat source is moved along, the advancing front of the area that has been thermally opened in accordance with this step of the invention can be seen to precede the location of the source by about 20 to 60 millimeters. It is to be understood that the thermal opening that is practiced in accordance with this step of the invention does not cause the edge to be severed from the glass instantaneously. In the case of glass 18 to 19 millimeters thick, about 1 to 2 millimeters of glass usually remains unsevered at the bottom of the fissure and resultant fracture propagation that has been opened by the application of the thermal energy in accordance with this step of the invention.

Referring to FIG. 3, there is shown a small hand-held gas torch 30 with a flame 31 directed toward a first end 32 of a deep-fissure score 34. Arrow A indicates the direction of travel of the torch as it passes from the first end 32 to a second end (not shown) of the deep-fissure score. As the torch 30 is moved from the first end 32 to the second end of the fissure, a deep fracture is propagated in a direction perpendicular to the glass surface leaving only a thin skin 38 holding the trim to the remainder of the piece of flat glass. In the case of the use of a small hand-held gas torch, the flame should be directed at an angle of 20° to 70° with respect to a major surface of the glass.

Referring to block 22, it is desirable, when higher quality cuts are desired to pass a blowtorch underneath the intended line of cut and along its entire length, taking for example, something like 7 to 15 seconds to traverse a length of 5 to 6 meters. This conditions the skin remaining to be broken at the base of the fracture to aid in obtaining a cut of even higher quality. When this step is used, it must follow after the top heating of the score. If the bottom heating precedes the top heating, there is no benefit obtained.

Referring now to block 24, pieces of flat glass that are longer than 3 meters and are having a narrow trim removed (25–75 millimeters) should be supported from the bottom at the score, as by the use of a board or plank. When this step is omitted (in long pieces) a cut exhibiting unwanted undercut defects tends to result.

The operation of block 26, snapping the bottom skin, may conveniently be done by causing, after the operators have put the plank under the location of the score, the application of a suitable bending moment to the outboard edges of the nearly-severed piece, e.g., by the action of a third man, applying the necessary force by means of suitable tongs or the like, while first and second men hold the plank under the line of cut. Sometimes heat will propagate the fracture to such an extent that the trim will be free of the piece of glass and step 26 is not necessary. This occurs about 20% of the time with large trims (either long or wide or both). This probably happens because large trims have higher weights than small trims and the higher weight creates a moment that is more likely to snap the glass.

At this point, there may be conducted an inspection to determine the quality of the cut that has been opened. In the inspection along the cut edge, looking horizontally, it is customary to see a pattern such as that indicated in FIG. 4. The top surface of the glass is there designated with the numeral 48, and a short distance therebeneath there is seen a marking 50 that has the appearance of a series of fine serrations and is indicative of the extent of the deep fissure caused by the penetration of the cutting wheel into the glass. As has been stated hereinafter, the marking 50 is in the case of glass 18 to 19 millimeters thick at least 1.75 millimeters from the top surface of the glass. Normally, the region between surface 48 and marking 50 includes about 6 to 30% of the thickness of the glass. Below the marking 50 there is a region 52 that is a smooth fracture and in the case of glass 18 to 19 millimeters thick extends for something like 15 to 17 millimeters of the thickness of the glass down its severed edge. Region 52 extends through the glass for about 60 to 90% of its thickness. Below that is a region 54 that is relatively unmarked and extends to the bottom surface 56 of the glass. Between regions 52 and 54 there is a faint line 58 that runs parallel to the bottom surface 56 and is spaced at 0.5 to 2 millimeters therefrom, this line 58 indicating the extent to which the fracture in the glass penetrates when it is thermally opened as taught hereinabove. The distance between line 58 and surface 56 corresponds to about 3 to 10% of the thickness of the glass. Of course, the dimensions indicated above will vary somewhat with glass pieces of different thickness, but the general arrangement and relationship remains the same.

As a final step, indicated in block 28, there is conducted a light seaming of the upper and bottom portions of the ends and edges of the piece of glass so cut. There may be used, for example, a hand-held belt sander using a belt 75 millimeters by 600 millimeters. This is a conventional operation, and it does not require further elaboration or explanation.

The result is that there is produced a finished piece of glass that compares favorably in its edge strength to similar pieces produced by the prior-art method of rough cutting, mechanical snapping, grinding to size, and then polishing. The pieces of the present invention have edge strength of about 4.35 to 4.63 kilograms per square centimeter in the conventional beam-loading test, in comparison with strengths such as 4.63 to 4.91 kilograms per square centimeter for the prior-art ground-and-polished pieces. Either will meet specifications on customary glazing installations. In achieving the edge-strength values indicated above, the final seaming operation is important. Without the final seaming operation, the edge strength is on the order of 3.27 to 3.60 kilograms per square centimeter.

The embodiment described above has also been used to produce suitably finished edges on glass 12 millimeters to 18 millimeters thick with the edges concerned being curved rather than straight. Another embodiment of the invention, as hereinafter described, is preferred for cutting curved edges.

FIG. 5 is a flow chart illustrating the steps of the embodiment of the invention suitable for cutting curved edges. For the most part, this embodiment is very similar to the first embodiment already disclosed and only the differences will be set forth in detail.

The deep fissure scoring of block 16' of FIG. 5 is identical to the deep fissure scoring of block 16 of FIG. 1. FIGS. 6, 7 and 8 show a typical setup for deep scoring the circumference of a circle on flat glass G' in accordance with this embodiment. The glass is placed on a cutting table 60 with a suitable template 62 mounted on the cutting table. Air pressure (not shown) is used to supply a force to the cutting tool 64.

Referring to block 18' of FIG. 5, this step is similar to the step of block 18 of FIG. 1. In block 18 of FIG. 1, a mechanical tap from beneath one end of the deep-fissure score is used to begin propagation of a fracture. According to the second embodiment, it has been discovered that by applying the tap from above at the center of curvature of a curved deep-fissure score, a fracture not only propagates to a greater depth as, in the tap beneath the score (block 18), but further, a tap at the center of curvature of the curved deep-fissure propagates the fracture around the entire circumference of the curved deep-fissure. It is important to point out that the mechanical tapping step of block 18 is not a critical part of the first described embodiment. It merely reduces dwell time with the heat torch. However, the top center tapping of block 18' of the second described embodiment is an essential part of this embodiment, since it eliminates the necessity of top heating the score (block 20') and it is faster to apply a firm tap to the center of a curved deep-fissure than to heat around the entire circumference. In other words, if the top center tap is omitted, one can use heat to propagate a fracture as in the first embodiment, but this is slower than top center tapping.

Referring to FIG. 10, there is shown a tool 80 that is used in the center tap step. The tool is placed at the center of curvature of the curve with portion 84 resting directly on the glass. The operator strikes portion 82 from above with a hammer or mallet.

Referring to block 20' of FIG. 5, the next step is to apply heat along the deep fissure from above to further propagate the fracture. This is similar to the step recited in block 20 of FIG. 1. As pointed out above, step 20' is not essential since the top center tap propagates the fracture to a great extent. However, when step 20' is incorporated into the process, an even higher quality edge is produced that requires less seaming.

Referring to block 22' of FIG. 5, heat is applied along said fracture from below to further propagate the fracture and leave a thinner skin. This heating from below is similar to the heating of block 22 in that it conditions the glass for breakout by further propagating the fracture. As above, this step is not an essential part of the invention, but it has been included for the sake of completeness.

Referring to blocks 24' and 24" of FIG. 5, edge nicks are applied to the flat glass and then heat is applied by dwelling a heat source at each of the nicks until a vent is completed from the nick to the fracture of the circle. This is done in cutting circles rather than the step of snapping bottom skins as in block 24 of FIG. 1.

Block 26' of FIG. 5 refers to the result of applying spot heat to the edge nicks around the piece of glass. After heat is applied to each of these edge nicks, the circle will become completely free of the trim. This is referred to as "breakout" because of the way that this result takes place. As the operator goes from one nick to another creating a plurality of vents, he is freeing the trim from the finished circle. This trim or scrap around the circle breaks free of the circle in a rather dramatic fashion which is referred to as "breakout."

Referring to FIG. 9, there is shown a view of the top glass surface after the edge nicks have been made. The layout of glass circles on the glass sheet forms no part of the present invention, but has been included merely as an example. It has been discovered that it is convenient to take four circles from a square piece of glass as illustrated in FIG. 9. The dimensions of the glass are such that each side is twice the diameter of the circles to be cut plus about 6.5 centimeters. Edge nicks are indicated at 70 in FIG. 9. Further a cross 72 is scored into the top surface of the glass between the four circles. Edge nicks 70 and cross 72 are then heated to cause the circles to "breakout." Heating cross 72 before edge nicks 70 yields a better curved edge on the circles.

This method of freeing circles from the trim is also used when curved edges are cut in accordance with the first embodiment. It has been included with the description of the second embodiment merely as a matter of convenience.

As a final step, indicated in block 28', there is conducted a light seaming of the upper and bottom portions of the circumference of the piece of glass so cut. This is identical to the procedure of block 28 in FIG. 1.

While the second embodiment has proved to be excellent for the cutting of curved edges, attempts to practice this second embodiment on straight lines have been futile. In the cutting of stranght edges, mechanical tapping from below one end of a score will propagate said score to a greater depth, but it will not make the score propagate to a deep fracture along the length of the score.

MODIFICATIONS, EQUIVALENTS AND EXTENSIONS OF THE INVENTION

The glass cut does not need to be 18 to 19 millimeters thick. Glass considerably thinner, down to 3 millimeters thick, or conceivably as thick as 60 or 90 millimeters, may similarly be cut and finished in accordance with the present invention. Of course, changes in the thickness of the glass dictate the necessity of other changes in the process. In general, the greater the thickness of the glass, the greater should be the diameter of the scoring wheel and the scoring force used to effect the deep fissure in the glass, and the deeper that fissure needs to be. For example, in cutting 3-millimeter glass, it is satisfactory to produce a fissure depth of 0.75 millimeter or more. With 6-millimeter glass, the fissure should be 1 millimeter or more in depth. With 13-millimeter glass, the fissure should have a depth of 1.5 millimeters or more. It can be said that the fissure should be 6 to 30 percent of the thickness of the glass, higher values being used with greater thicknesses and lower values with thinner thicknesses.

As the glass becomes thicker, it becomes increasingly difficult to produce with a scoring wheel of a given diameter a fissure of the required depth without causing the development of unwanted or excessive "wing." This means that with thicker glass, a larger scoring wheel should be used, and with thinner glass, the use of a somewhat smaller scoring wheel is permissible. The results, when an attempt was made to cut 18.5-millimeter glass with a wheel about 9 millimeters in diameter, were marginal. Similarly, the results were marginal when an attempt was made to cut 13-millimeter glass with the use of a wheel about 5 millimeters in diameter.

The force required to produce the fissure also increases as the fissure depth increases. For example, the required fissure depth of 1.5 millimeters for 13-millimeter glass can be produced with a force of 20.5 kilograms, using a scoring wheel of the shape shown in FIG. 2, whereas the force required for a fissure of the required depth 1.75 millimeters for 19-millimeter-thick glass, using the same kind of wheel, is 56.9 kilograms. It might be said that the force to be used varies from about 1.0 kilogram per millimeter of glass thickness (for glass about 3 to 10 millimeters in thickness) up to about 5.0 kilograms per millimeter of glass thickness (for glass 60 to 90 millimeters thick). The overriding consideration in all cases is, of course, the depth of the fissure produced, which must in all cases be of sufficient depth as to cause the propagation of the cut downward, i.e., substantially perpendicular to the major surfaces of the piece of glass being cut, rather than transversely, i.e., with the development of substantial "wing," when heat is subsequently applied.

The use, in accordance with this invention, of a trim less than one and one-half times the thickness of the piece of glass being cut is considered, in most instances, inadvisable. This represents, nevertheless, a considerable advance in the art of cutting glass, since it has hitherto been usual to insist upon taking a trim at least 8 times the thickness of the glass. This has implications that it may, in some instances, now be possible to operate a preceding glass-producing operation so as to produce a ribbon or plate that has dimensions that are somewhat smaller than would otherwise have been required, with an obviously favorable effect upon the overall economy of the process. For example, prior to the instant invention, it was considered necessary to produce a float-glass ribbon 330 millimeters wide in order to obtain a finished piece 300 millimeters wide; in accordance with this invention, a ribbon of that width will yield a finished piece 315 millimeters wide, or a finished piece of the 300 millimeter width could be produced with a float-glass ribbon only 315 millimeters wide. A similar saving is obtained on the ends of the piece being finished.

With the thermal-opening procedure of the instant invention, it has become possible to snap off a trim from one side of a piece of glass and leave a cut edge of satisfactory characteristics; however great the length of the side; whereas prior methods for cutting heavy glass were limited (without grinding being used) to use with sides not more than about 1 to 2 meters in length, there is with the present invention no limitation except that imposed by the considerations of handling and shipping the product piece of glass.

Those skilled in the art will appreciate that there are various ways in which the scoring wheel 4 may be brought into contact with a surface of a piece of glass that is to be finished in accordance with the invention while still obtaining satisfactory results. It will suffice, for the present, to state that the scoring wheel that may have passed through its central opening 14 an axle that is journaled in a cage that is supported for vertical movement, under suitable spring loading, in a channel that is contained in one leg of a C-shaped housing, the opposite leg of which comprises means containing a roller for bearing upon the glass in opposition to the scoring wheel 4.

It is also anticipated that the second embodiment can be modified to cut round holes in sheets of glass. In such a case, edge nicks would be placed within the circle. After the nicks are heated to create vents, the circle is cooled while the remainder of the sheet is heated to release the circle and leave a hole in the sheet with a good edge.

What is claimed is:

1. An apparatus for producing a smooth cut edge on a piece of flat glass comprising:
   means for supporting a flat piece of glass in a plane with a major surface of said glass exposed,
   a rotary glass cutting means having a diameter of at least about ½ inch and having a curved peripheral cutting edge with a cutting angle of at least about 150° movably mounted for movement in a path lying in a plane perpendicular to the exposed surface of said piece of glass and positioned so that said cutting edge engages said exposed surface of said piece of glass with sufficient force to form, during relative movement between said cutting means and said piece of glass, a deep-fissure score of a depth of at least 1.5 mm. in said piece of glass,
   means for providing relative movement between said cutting means and said piece of glass to produce said deep-fissure score along the desired path of cut in said piece of glass, and
   means for applying force to sever said piece of glass along said deep-fissure score, said last named means being positioned so that said severing follows in proximate sequence said forming of said deep-fissure score in said piece of glass,
   whereby said rotary glass cutting means and said means for applying force to sever said piece of glass are disposed, sequentially in that order, to apply their respective forces progressively to the piece of glass and produce a smooth cut edge on said piece of glass.

2. An apparatus in accordance with claim 1 wherein said means for applying force to sever said piece of glass comprises:
   means for projecting said deep fissure deeper into said piece of glass, and
   separate means for completing the severing of said piece of glass along the path of said deep-fissure score.

3. An apparatus in accordance with claim 1 wherein said means for applying force to sever said piece of glass comprises:
   thermal means for projecting said deep fissure deeper into said piece of glass by applying heat energy progressively along the path of said deep-fissure score, and
   bending means for completing the severing of said piece of glass along said path of said deep-fissure score.

4. An apparatus in accordance with claim 3 wherein the cutting angle of said rotary glass cutting means is about 160°.

5. An apparatus in accordance with claim 1 wherein said rotary glass cutting means produces said deep-fissure score along a curved path and wherein said means for applying force to sever said piece of glass comprises:
   means disposed adjacent to said major surface of said supported piece of glass for propagating said deep-fissure score deeper through the thickness of said piece of glass and around the entire curved path by applying a tap at the center of curvature of said deep-fissure score, and
   means supported adjacent the trim glass located outside of said curved path for venting said trim glass and breaking out a piece of glass with a curved cut edge following said curved path of said deep-fissure score.

6. An apparatus in accordance with claim 5 wherein the cutting angle of said rotary glass cutting means is about 160°.

References Cited
UNITED STATES PATENTS

| | | | |
|---|---|---|---|
| 3,474,944 | 10/1969 | Chatelain et al. | 225—93.5 |
| 2,641,870 | 6/1953 | Eisler | 225—93.5 XR |
| 3,593,899 | 7/1971 | De Torre. | |

ARTHUR D. KELLOGG, Primary Examiner

U.S. Cl. X.R.

65—112; 225—2, 93.5